united States Patent Office 3,418,175
Patented Dec. 24, 1968

3,418,175
METHOD FOR PRODUCING A ROUGH CORROSION RESISTANT SURFACE ON REINFORCING MATERIAL OF IRON ADAPTED FOR CASTING INTO CONCRETE
Claes Hommerberg, Falsterbo, Sweden, assignor to Halmstads Jarnverks AB, Halmstad, Sweden, a joint stock company of Sweden
No Drawing. Filed May 17, 1965, Ser. No. 456,538
Claims priority application Sweden, May 19, 1964, 6,058/64
3 Claims. (Cl. 148—6.35)

ABSTRACT OF THE DISCLOSURE

Iron reinforcing material for inclusion in a concrete object is provided with a rough-corrosion-resistant rust coating. This is accomplished by immersing the material in an aqueous solution of ferric chloride, after which the material is left to dry in air.

---

This invention relates to a method for producing a rough corrosion resistant surface on reinforcing material of iron, such as reinforcing wire, reinforcing bars and/or reinforcing cable.

It is previously known to provide iron reinforcing material to be cast into concrete with a rough corrosion resistant surface by coating the material with a layer of rust. The material can, for example, be treated with water vapour and subsequent air drying whereby the desired rust coat is obtained. This method, however, is tedious. The material can also be immersed in a diluted acid or common salt solution and thereafter be dried in air. By this latter method, it is true, a certain time gain is made, but the metal becomes hydrogen brittle which is a serious deficiency for a reinforcing material.

The present invention has as its object to eliminate the aforesaid drawbacks and to produce quickly a suitable coat on the iron reinforcing material by using an aqueous solution of iron (III) chloride instead of an acid or common salt solution. Hereby the treatment time is shortened and there is no risk of hydrogen brittleness because no hydrogen gas is developed during the treatment. The aqueous solution shall contain from 2.5 to 15%, by weight, of the iron (III) chloride, a preferred specific concentration being about 3% by weight. The solution used shall not contain any other substances which may substantially affect the neutrality of the solution and thereby give rise to the risk of hydrogen gas development. The correctness of the inventive idea was fully proved by experiments. The method, thus, includes neither pickling nor etching.

Example

According to the invention the iron reinforcing material is immersed in an aqueous solution of iron (III) chloride at room temperature and thereafter exposed to the effect of air for about one hour. The treatment time depends on the temperature of the air and on the intensity of the air circulation. The material shows thereafter the rough corrosion resistant surface which probably consists of a mixture of $Fe_2O_3$ and $Fe_3O_4$, and the metal does not show any hydrogen brittleness. A 3 percent solution of $FeCl_3$ has proved sufficient to quickly result in a suitable layer.

What I claim is:
1. A method for producing a rough corrosion resistant surface coating of wholly inorganic origin on reinforcing material of iron without making the iron hydrogen brittle, which comprises immersing the reinforcing material in a substantially neutral aqueous solution of iron (III) chloride, said solution consisting essentially of 2.5 to 15 percent by weight of said iron (III) chloride, the concentration of free hydrogen ions in the solution being substantially nil, and then drying the reinforcing material in air thereby producing on the surface of the material a coating consisting of a mixture of $Fe_2O_3$ and $Fe_3O_4$.
2. The method according to claim 1, wherein the immersing in the solution of iron (III) chloride is carried out at room temperature.
3. The method according to claim 1, wherein the concentration of the aqueous solution of iron (III) chloride is about 3 percent by weight.

References Cited

UNITED STATES PATENTS 1,082,161   12/1913   Lang _____ 148—6.14 X

RALPH S. KENDALL, *Primary Examiner.*

U.S. Cl. X.R.

148—6.14